United States Patent [19]

Soon-Fu

[11] Patent Number: 4,768,460
[45] Date of Patent: Sep. 6, 1988

[54] PEN-LIKE TIRE GAUGE

[76] Inventor: Hwang Soon-Fu, No. 40, Hsing-Yi Street, Suang-Yen District, Taipei, Taiwan

[21] Appl. No.: 937,025

[22] Filed: Dec. 1, 1986

[51] Int. Cl.$^4$ .................. G01L 17/00; G01L 7/16
[52] U.S. Cl. ................ 116/272; 116/34 R; 73/744
[58] Field of Search .............. 116/34 R, 266, 272, 116/281; 73/146.3, 146.8, 744, 709; 137/227–229, 557; 24/11 F, 11 HC, 11 PP, 11 R, 10 R

[56] References Cited

U.S. PATENT DOCUMENTS

| 1,220,272 | 3/1917 | Pollock | 73/744 |
|---|---|---|---|
| 1,263,165 | 4/1918 | Vincent | 73/744 |
| 1,274,620 | 8/1918 | Sonnichsen | 73/744 |
| 1,276,089 | 8/1918 | Loomis et al. | 116/34 R |
| 1,582,523 | 4/1926 | Larson et al. | 137/227 |
| 1,584,865 | 5/1926 | Kahle | 73/744 |
| 2,047,405 | 7/1936 | Byars | 137/227 |
| 2,183,350 | 12/1939 | Goessling | 24/11 F |
| 3,289,480 | 12/1966 | Sams | 73/146.3 |
| 3,696,668 | 10/1972 | Patrick | 73/146.8 |
| 3,999,430 | 12/1976 | Parduhn | 73/146.3 |

FOREIGN PATENT DOCUMENTS

| 460381 | 11/1950 | Italy | 116/272 |
|---|---|---|---|
| 191158 | 1/1923 | United Kingdom | 24/11 F |
| 1209698 | 10/1970 | United Kingdom | 73/146.3 |

Primary Examiner—William A. Cuchlinski, Jr.
Assistant Examiner—W. Morris Worth

[57] ABSTRACT

A pen-like tire gauge includes a barrel body shaped as a pen, a guide cylinder secured in the barrel body, a plunger slidingly moving in the cylinder and carrying a semi-cylindrical scale having graduations marked thereon to dispose around the guide cylinder and resiliently tensioned by a restoring spring inserted in a bore of the barrel body, and an air adapter adapted to connect a tire inflating valve for measuring air pressure in the tire when the air is directed into the cylinder to force the plunger and to move the scale for its pressure reading and measurement through a transparent window formed on the body.

3 Claims, 2 Drawing Sheets

PEN-LIKE TIRE GAUGE

BACKGROUND OF THE INVENTION

Byars disclosed a "Combined Tire Inflator and Pressure Gauge" in his U.S. Pat No. 2,047,405, which however has the following disadvantages:

1. The cup leather (his numeral 39) is too short to be stably reciprocated within the bore of gauge body (10). If such a cup leather (39) serving as a piston is made to be a longer "plunger", the gauge body (10) must be extended longer to allow the movement of the gauge rod (37) to cause inconvenience for its carriage.
2. The spring (40) is retained by a washer (36) which is fixed within the body (10) and is therefore not adjustable in case of fatigue failure of the spring (40).
3. If the spring (40) is made to be adjustable, the length of the spring must be so long enough to be across the bore of thebody (10), whereby the coils of the spring (40) will be visible through the window (32) to influence the reading of the pressure data as shown on the gauge rod (37).

The presnt inventor has found the defects of Byars' U.S. Pat. No. 2,047,405 and invented the present tire gauge.

SUMMARY OF THE INVENTION

The object of the present invention is to provide a tire gauge including a barrel body shaped as a pen, a guide cylinder secured in the barrel body, a tubular piston reciprocating in the guide cylinder as driven by testing air pressure from a measured tire and carrying a semi-cylindrical scale marked with graduations thereon slidingly moving on the guide cylinder, and an air adapter adapted to connect an air inflating valve formed on a tire for directing testing air therethrough and also for releasing the air, after being measured, through a side opening formed on the adapter upon the depression of a releasing button, so that the entire gauge forms a compact unit easily portable and conveniently measurable.

DETAILED DESCRIPTION

Figure 1:
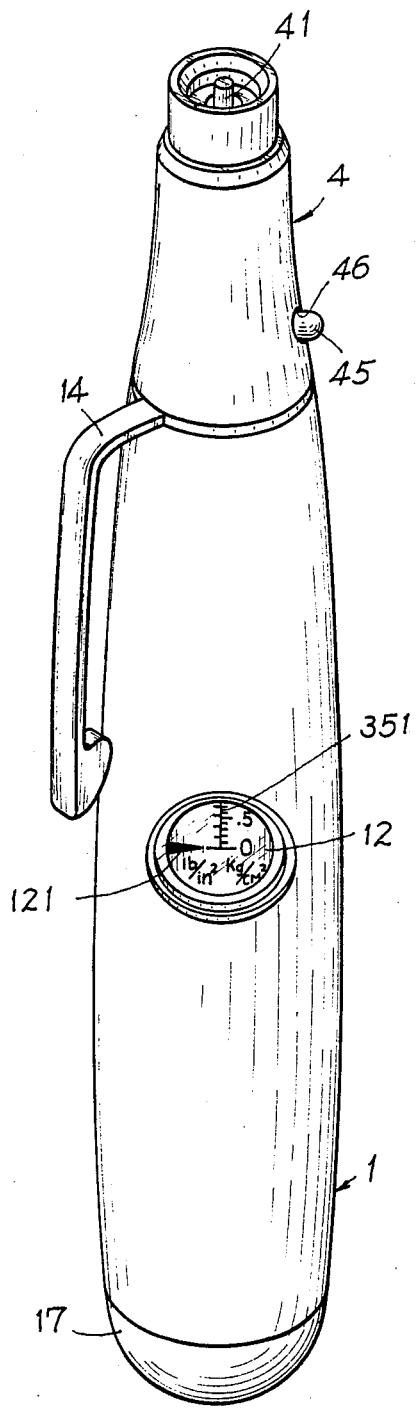
FIG. 1 is a perspective drawing of the present invention.
Figure 2:
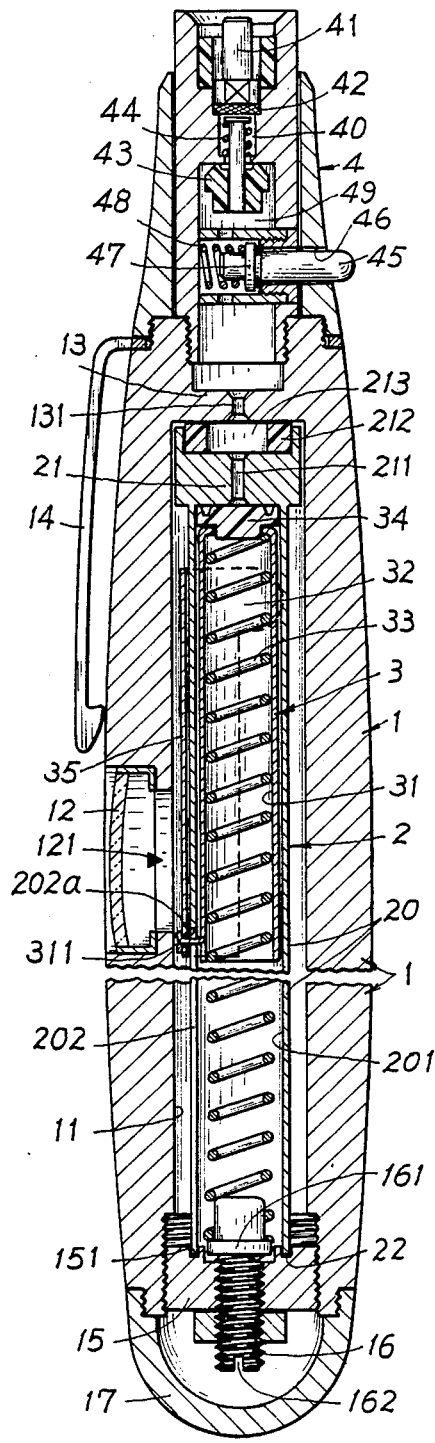
FIG. 2 is a sectional drawing of the present invention.
Figure 3:
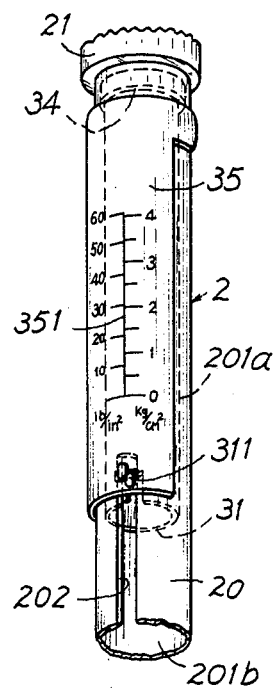
FIG. 3 is a partial perspective view showing a tubular piston and a guide cylinder in accordance with the present invention.

As shown in FIGS. 1-3, the present invention comprises: a barrel body 1 shaped as a pen, a guide cylinder 2 secured in the body 1, a tubular piston 3 reciprocating in the cylinder 2, and an air adapter 4 adapted to connect an air inflating valve of tire (not shown) to direct air into the cylinder 2 for measuring air pressure of the tire air.

The barrel body 1 generally shaped as a pen includes a longitudinal bore 11 formed in the body 1 having an upper end plate 13 drilled with an air passage 131 adjacent to the air adapter 4 and a lower disk 15 secured to the lower portion of the body 1 having formed therein a screw 16, a clip 14 fixed between the air adapter 4 and the body 1 adapted for fixing the gauge on a user's pocket, a bottom cap 17 fixed on the bottom end of the body 1 to encase the disk 15 and screw 16 within the cap 17, and an inspection window 12 formed on the central portion of body 1 having an arrow mark 121 formed thereon for pointing the measured data of the air pressure in a tire and made of a transparent lens.

The guide cylinder 2 having a length generally same as that of the bore 11 of body 1 is shaped as a longitudinal cylinder 20 having an inner cylindrical hole 201 and divided into an upper closed-cylinder portion 201a and a lower opened-cylinder portion 201b from the intermediate portion of the cylinder 20, and an upper head 21 drilled with an air passage 211 which is disposed with an annular packing 212 having a central opening 213 communicated with the air passage 131 of body 1. The lower end 22 of cylinder 20 is engaged with an annular groove 151 of the disk 15. The screw 16 includes a spring retainer 161 for limiting the lower portion of a spring 33 of piston 3 and a slot 162 formed on the outer end of screw 16 for adjusting the screw 16 adjustably mounted on the disk 15.

The tubular piston 3 includes a cylindrical plunger 31 having a length one half the length of hole 201 and having a hollow portion 32 within a cylindrical wall of plunger 31, a piston ring 34 fixed on the top end of the plunger 31 and slidingly engaging with the cylindrical hole 201 of guide cylinder 2, a restoring spring 33 having a length equal to the length of the cylindrical hole 201 inserted in the hollow portion 32 of piston 3 and retained on the spring retainer 161 of screw 16, and a semi-cylindrical scale 35 marked with graduations 351 of pressure data such as psi or kg/cm$_2$ thereon disposed around the upper cylinder portion 201a of cylinder 20 secured to the lower end of the plunger 31 by a lug 311 which is upwardly limited by the upper edge 202a of a longitudinal slot 202 formed on the lower cylinder portion 201b. The spring 33 is designed to normally tension the piston 3 upwardly to coincide the "zero" graduation of scale 351 with the arrow mark 121 formed on inspection window 12 when no load of testing pressure applied. For calibration or adjustment of the present invention, the screw 16 can be rotated at the slot 162 to adjust the tension of the spring 33. The presure data is increased upwardly from the lowest zero graduation as shown in FIGS. 1 and 3.

The air adapter 4 includes a chuck 41 adapted to connect an air inflating valve of a tire to be measured of its inner air pressure, a filter 42 fixed in the adapter for screening dust laden in the air, a check valve 43 resiliently held by a spring 44 to normally seal a chuck opening 40 under chuck 41 and operatively opened by inlet air from a tire, a releasing button 45 transversely depressible through a button hole 46 formed in the adapter 4 having a retainer 47 normally tensioned outwardly by a spring 48 held by the retainer 47 to normally seal the button hole 46, and a cavity 49 fluidically communicated with opening 40 and air passage 131. The diameter of the button 45 is slightly smaller than that of hole 46 to allow air releasing through an aperture between the button 45 and the hole 46 upon the depression of the button 45.

When measuring the air pressure of a tire, the adapter chuck 41 is coupled to the tire inflation valve to direct air flowing through chuck opening 40, cavity 49, passage 131, passage 211 to force the piston plunger 31 downwardly until the air pressure in cylinder 2 being at equilibrium with the tire pressure and the scale 35 is synchronously moved downwardly to stop at the equilibrium whereby the measured pressure data is indicated as pointed by the arrow 121. The higher the pressure is, the scale 35 will be downwardly moved, whereby the greater pressure data will then be shown.

If the testing area for applying the tire gauge is not suitable for reading, the gauge can be removed from the coupled tire valve to a convenient place for measurement reading. Since the check valve 43 normally seals the chuck opening 40 of adapter 4, the valve 43 will instantly seal the opening 40 without serious leakage loss of air therethrough once removing the adapter 4 from a tire valve, to thereby have no influence of the measuring precision.

By depressing the button 45 the air existing in the cylinder 2 will then be discharged through button hole 46.

The present invention is superior to Byars' U.S. Pat. No. 2,047,405 because:
1. The scale 35 is "jacketed" outside the cylinder 2 to allow the plunger 31 being made longer to be stably reciprocated within the cylinder 2.
2. The spring 33 is longer across the full length of the cylinder 2 and can be adjusted by driving screw 16 after fatigue failure or when calibration adjustment is needed.

I claim:

1. A pen-like tire gauge comprising: a barrel body generally shaped as a pen including a longitudinal bore formed in the body having an upper end plate drilled with a first air passage and having a lower disk fixed on the lower portion of said body, a screw adjustably fixed on said lower disk, a clip adapted to be carried by user's pocket fixed between the body and an air adapter, a bottom cap covering the screw and the lower disk of said body, and an inspection window formed on the central portion of said body having an arrow mark formed thereon:

a guide cylinder secured between said upper end plate and said lower disk of said body, said guide cylinder being shaped as a longitudinal cylinder having an inner cylindrical hole, said guide cylinder being divided from an intermediate portion of said longitudinal cylinder into an upper closed-cylinder portion and a lower opened-cylinder portion having a longitudinal slot formed on said lower cylinger portion, and an upper head having a second air passage disposed by an annular packing formed on an upper end of said guide cylinder to fluidically communicate with said first air passage of said barrel body;

a tubular piston having a cylindrical plunger formed with an upper piston ring thereon, said cylindrical plunger having a length one half of a length of said inner cylindrical hole of said guide cylinder and slidingly engaging with said inner cylindrical hole of said guide cylinder, said cylindrical plunger having a hollow portion formed therein for inserting a restoring spring which has a length equal to the length of the inner cylindrical hole of said guide cylinder and is adjustably limited by said screw of said body, and a semicylindrical scale secured to said plunger and disposed around said upper closed-cylinder portion of said guide cylinder and marked with graduations of pressure data on said scale, a zero graduation of said scale coinciding with the arrow mark of said inspection window when no air pressure from the tire is applied and said restoring spring is normally biasing said plunger upwardly, said plunger having said scale secured thereto by a lug upwardly limited by an upper edge of said longitudinal slot formed on said lower opened-cylinder portion of said guide cylinder; and said adapter having a chuck adapted to connect an air inflating valve of a tire for directing tire air to be tested into said guide cylinder through a check valve resiliently held in said adapter to normally close a chuck opening to prevent leakage loss and operatively opened when said adapter is coupled to the air inflating valve, and a releasing button transversely depressible through a button hole formed on said adapter resiliently held by a spring to normally seal said button hole and operatively opened to release air inside the cylinder upon a depression of said releasing button.

2. A tire gauge according to claim 1, wherein a filter is mounted in said air adapter for screening dust laden incoming tire air before enterring said barrel body.

3. A tire gauge according to claim 1, wherein said inspecton window is made of a transparent lens.

* * * * *